Patented Sept. 19, 1950

2,522,560

UNITED STATES PATENT OFFICE 2,522,560

METHOD FOR THE STABILIZATION OF SOFT ROES OF FISH AND PRODUCT OBTAINED THEREBY

Lucette Bénard, Forest par Moutier-Rozeille, France, assignor to Marc Antoine Eugene Assada, Villefranche-sur-Saone (Rhone), France No Drawing. Application November 29, 1946, Serial No. 713,080. In France December 4, 1945

2 Claims. (Cl. 167—74)

It is an object of my invention to stabilize soft roe of fish, that is to say to treat the latter in such a way that it may be preserved.

Another object is obtaining defatted and dehydrated soft fish roe, so that the latter can be preserved.

A further object is to enable to produce in an industrial way large quantities of nucleic acid, and I attain it by using to this end the abundant source of raw material constituted by the soft roe of fish, said soft roe containing nucleic acid in substantial amounts.

Still a further object is supplying the production of nucleic acid with an abundant original raw material at comparatively low cost price, by using to this end soft roe of fish, a not very expensive material not used in an industrial way.

It is a still further object to enable the production of nucleic acid from soft fish roe to extend over a period longer than that during which the fish are soft-roed.

It is a still further object to prepare, starting from soft roe of fish, a product which has maintained the hormones contained in the original raw material.

Lastly, it is a further object of the present invention to render effective all or part of the above mentioned objects by a simple and efficient process.

In accordance with the objects of my invention, fresh fish roes are treated preferably in the form of torn strips with a substance that is able to separate out water and oil, for instance acetone, and this solvent is completely exhausted through a treatment in a vacuum dryer. A residual product is thus gotten that is dry and rotproof, that preserves its properties for an indefinite period, especially as concerns the hormone properties of the original substance, and that forms a new commercial product.

Preferably the method comprises several successive treatments with the solvent separating out the water and oil in order to reach a stage of complete oil-separation and deodorisation.

Among the solvents to be considered, acetone may be regarded as being of special suitability.

As an example that is in no way restrictive, a description will be given of a particular application of the method that forms the object of my invention.

The practical working of this application consists of the following series of steps:

1. Tearing off the roe into strips by any suitable means such as the use of crushers, pulpers, choppers etc.

2. The shredded material is placed in contact with acetone, the approximate proportions being 1 part of roe and 3 parts of acetone in volume.

Then the mixture is carefully mixed so that eventually all the particles of roe may come into contact with the acetone.

3. It is all thrown on to a filter such as linen fabric not too closely woven for instance and allowed to drain.

4. A succession of washings with a little acetone, completes the oil-separation and deodorisation.

5. The well-drained product is spread as a thin layer on porous plates, that are put in a digester at a temperature of 56° C. under 60 cm. of mercury for a few hours, until completely dried.

Then the product obtained is found to be granular, dry, corneous, easy to crush.

The yields from the series of working stages is substantially:

|  | Per cent |
|---|---|
| Water | 40 |
| Oil | 20 |
| Dry material | 40 |

The water and oil are separated out by the acetone from which they are separated by distilling the mixture: acetone has a boiling-point of 56° C. When the water no longer contains enough acetone for holding the oil in emulsion, the separation out of the oil is effected without trouble.

The product obtained can be preserved for a long time and may be used at any time as a raw material for the extraction of certain of its component ingredients, for instance nucleic acid. The extraction of the latter may be carried out on standard lines.

What I claim is:

1. A granular, stable and preservable therapeutic product consisting of soft fish roe, dehydrated and defatted by repeated treatment with acetone and dried at low temperature under reduced pressure, said product containing the active constituents and the hormone components of soft fish roe in unchanged condition.

2. The process of manufacturing a stable and preservable product from soft fish roe, which contains the active constituents and the hormones of soft fish roe in unchanged condition and which consists in breaking down fresh soft roe, treating the crushed roe with acetone, filtering the resulting mixture, treating again the filtered residue with acetone and drying said residue at low temperature and under reduced pressure in order to avoid the impairment of valuable constituents of the starting material.

LUCETTE BÉNARD.

REFERENCES CITED

The following references are of record in the file of this patent:

UNITED STATES PATENTS

| Number | Name | Date |
|---|---|---|
| 125,248 | Adamson et al. | Apr. 2, 1872 |
| 547,548 | Herwig | Oct. 8, 1895 |
| 587,278 | Carnrick | July 27, 1897 |
| 1,271,111 | Aldrich | July 2, 1918 |
| 1,796,027 | Iscovesco | Mar. 10, 1931 |
| 1,903,503 | Conn | Apr. 11, 1933 |
| 1,934,677 | Ash | Nov. 14, 1933 |
| 2,358,869 | Maurer et al. | Sept. 26, 1944 |
| 2,362,993 | Fleischer | Nov. 21, 1944 |
| 2,399,742 | Jones | May 7, 1946 |